United States Patent
Rastogi (12)

(10) Patent No.: US 11,551,140 B1
(45) Date of Patent: Jan. 10, 2023

(54) ADJUSTING A VALUE ASSOCIATED WITH PRESENTING AN ONLINE SYSTEM USER WITH A LINK THAT INITIATES A CONVERSATION WITH AN ENTITY VIA A MESSAGING APPLICATION

(71) Applicant: Meta Platforms, Inc., Menlo Park, CA (US)

(72) Inventor: Vibhor Rastogi, Redwood City, CA (US)

(73) Assignee: Meta Platforms, Inc., Menlo Park, CA (US)

(*) Notice: Subject to any disclaimer, the term of this patent is extended or adjusted under 35 U.S.C. 154(b) by 552 days.

(21) Appl. No.: 16/597,742

(22) Filed: Oct. 9, 2019

(51) Int. Cl.
| | | |
|---|---|---|
| *H04L 51/04* | (2022.01) | |
| *G06N 20/00* | (2019.01) | |
| *G06Q 30/08* | (2012.01) | |
| *G06F 16/958* | (2019.01) | |
| *G06F 16/955* | (2019.01) | |

(52) U.S. Cl.
CPC ........... *G06N 20/00* (2019.01); *G06F 16/958* (2019.01); *G06F 16/9558* (2019.01); *G06Q 30/08* (2013.01)

(58) Field of Classification Search
CPC ... G06N 20/00; G06F 16/958; G06F 16/9558; G06Q 30/08; H04L 51/04
USPC ............................................ 706/12; 715/200
See application file for complete search history.

(56) References Cited

U.S. PATENT DOCUMENTS

| | | | | |
|---|---|---|---|---|
| 8,364,617 | B2* | 1/2013 | Laxman | G06K 9/6256 |
| | | | | 706/45 |
| 10,467,630 | B2* | 11/2019 | Iyer | G06F 16/33 |
| 2019/0102687 | A1* | 4/2019 | Terra | G06Q 50/205 |

OTHER PUBLICATIONS

Techboomers, Facebook Messages, Published Apr. 29, 2016 via TechBoomers, pp. 1-2 (pdf).*
Shanika Perera, Positive or Negative? Spam or Not-spam? A simple Text Classification problem using Python, Published Jun. 28, 2019 via medium.com, pp. 1-10 (pdf).*

* cited by examiner

*Primary Examiner* — Manglesh M Patel
(74) *Attorney, Agent, or Firm* — Fenwick & West LLP

(57) ABSTRACT

An online system presents content to its users, in which the content includes links that launch a messaging application and initiate conversations via the application. The system receives information indicating that negative experiences occurred during the conversations and may use this information and attributes of entities participating in the conversations to train a model to predict a likelihood of an occurrence of a negative experience. Upon determining an opportunity to present a user with a link that launches the application and initiates a potential conversation with an entity via the application, the system applies the model to predict a likelihood of an occurrence of the negative experience by the user during the potential conversation based on the entity's attributes. Based on the predicted likelihood, the system adjusts a value associated with presenting the link and passes the adjusted value to a process that selects content for presentation to the user.

20 Claims, 5 Drawing Sheets

ADJUSTING A VALUE ASSOCIATED WITH PRESENTING AN ONLINE SYSTEM USER WITH A LINK THAT INITIATES A CONVERSATION WITH AN ENTITY VIA A MESSAGING APPLICATION

BACKGROUND

This disclosure relates generally to online systems, and more specifically to adjusting a value associated with presenting an online system user with a link that initiates a conversation with an entity via a messaging application.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. Content items presented to online system users may include links that launch various types of applications, such as messaging applications. For example, a content item associated with an entity may include a link that launches a messaging application and initiates a conversation with the entity via the messaging application.

Conventionally, to maximize user engagement with online systems, online systems select content for presentation to their users based on values associated with presenting the content to the users, in which the values are determined based on predicted affinities of the users for the content. An affinity of an online system user for content may be predicted based on various types of information maintained in the online system, such as user profile information associated with the user, information describing previous interactions by the user with similar content, information describing previous interactions with the content by similar online system users, etc. For example, an online system may predict that an online system user has a higher affinity for a first content item than for a second content item if the user previously clicked on or performed a conversion in association with being presented with content items similar to the first content item, but did not do so in association with being presented with content items similar to the second content item.

However, it may be difficult for online systems to accurately predict affinities of their users for content if the content includes links that launch messaging applications and initiate conversations via the messaging applications. The reason for this is that while the online systems may be able to determine whether their users interacted with the links included in the content, the online systems may be unable to determine whether negative experiences occurred during conversations initiated by the links. Therefore, online systems may be unable to take this information into account when predicting affinities of their users for the content, making it difficult for the online systems to determine accurate values associated with presenting content including such links to their users.

SUMMARY

To maximize user engagement with online systems, online systems conventionally select content for presentation to their users based on values associated with presenting the content to the users, in which the values are determined based on predicted affinities of the users for the content. However, it may be difficult for online systems to accurately predict affinities of their users for content if the content includes links that launch messaging applications and initiate conversations via the messaging applications because the online systems may be unable to determine whether negative experiences occurred during the conversations. Thus, online systems may have difficulty determining accurate values associated with presenting content to their users if the content includes such links.

To address this issue, an online system adjusts a value associated with presenting an online system user with a link that initiates a conversation with an entity via a messaging application. More specifically, the online system presents a set of content items to a set of online system users, in which each of the content items includes a link that launches the messaging application and initiates a conversation via the messaging application. The online system receives information indicating that a negative experience occurred during each of a set of conversations between a subset of the users and a set of entities via the messaging application, in which each of the set of conversations was initiated by a link included in each of a subset of the content items. Based at least in part on the received information and a set of attributes of each of the set of entities, the online system may then train a machine-learning model to predict a likelihood of an occurrence of the negative experience. The online system determines an opportunity to present a viewing user of the online system with a link that launches the messaging application and initiates a potential conversation with an entity via the messaging application. The online system then applies the trained machine-learning model to predict a likelihood of an occurrence of the negative experience by the viewing user during the potential conversation, in which the likelihood is predicted based at least in part on a set of attributes of the entity. Based at least in part on the predicted likelihood, the online system adjusts a value associated with presenting the link that initiates the potential conversation and passes the adjusted value to a content selection process that selects content for presentation to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
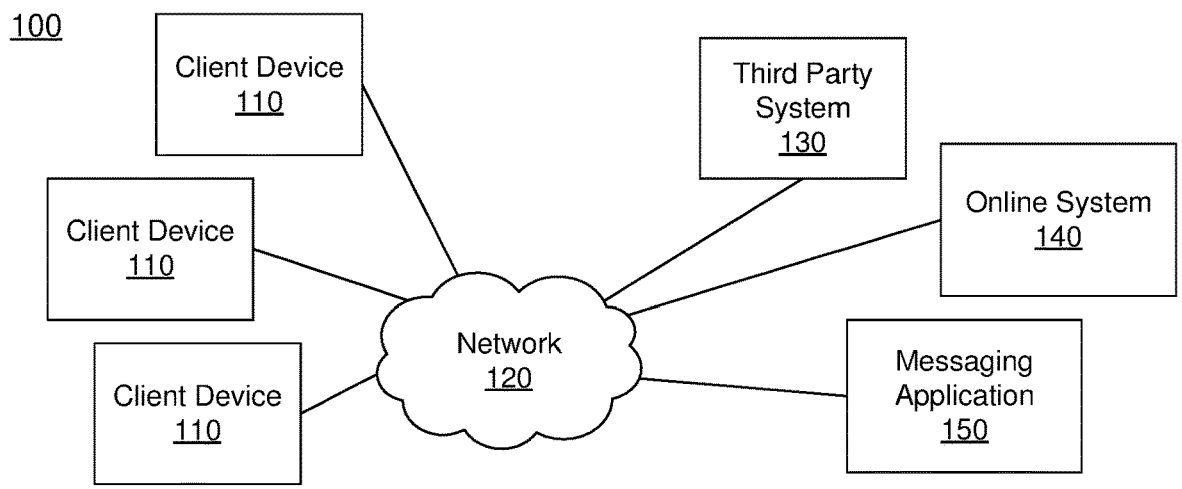
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, the online system 140, and a messaging application 150. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

One or more messaging applications 150 may be coupled to the network 120 and allow users of the online system 140 to communicate with each other or with entities (e.g., businesses or organizations) via the messaging application(s) 150. Online system users and/or entities may participate in conversations by using client devices 110 associated with the users and/or entities to send and receive messages via the messaging application(s) 150. Messages included in a conversation via a messaging application 150 are presented in a chat user interface in chronological order and may include various types of information associated with each message (e.g., information indicating a time at which each message was sent or received, information identifying a user or an entity who composed each message, etc.). For example, a chat user interface may be presented in a display area of a client device 110 associated with an online system user or an entity participating in a conversation via a messaging application 150. In this example, newer messages are presented in a lower position of the chat interface than older messages and each message includes a timestamp indicating when it was received at the client device 110, as well as a username or a profile image of the user or the entity who composed the message. Messages communicated via a messaging application 150 may include text data (e.g., words or phrases), image data (e.g., emojis, GIFs, photos, etc.), video data, audio data (e.g., voice messages, music, etc.), hyperlinks, objects (e.g., page posts or articles), or any other suitable types of content that may be communicated via the messaging application 150.

A messaging application 150 may be launched by a link that is presented to a user of the online system 140. In some embodiments, the link may be included among content presented to the user. For example, a link that launches a messaging application 150 may be included in a content item that is presented to a user of the online system 140 (e.g., in a newsfeed associated with a user profile of the user). In this example, the messaging application 150 may be launched on a client device 110 associated with the user upon receiving an interaction with the link (e.g., a click on the link) at the client device 110. Furthermore, a link that launches a messaging application 150 also may initiate a conversation with an online system user or an entity via the messaging application 150. In the above example, if the content item is associated with a particular entity (e.g., a business entity or an organization), a conversation with the entity via the messaging application 150 may be initiated upon receiving the interaction with the link.

Figure 2:
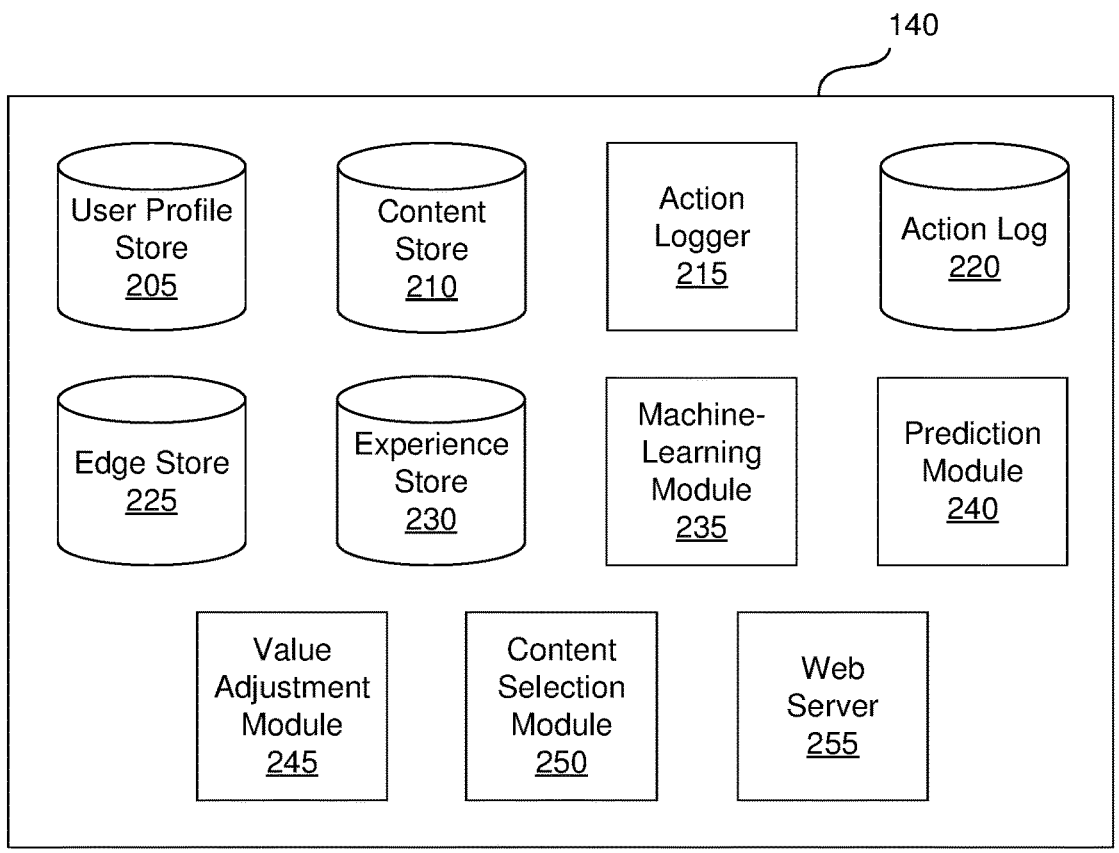
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an experience store 230, a machine-learning module 235, a prediction module 240, a value adjustment module 245, a content selection module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The experience store 230 may store information indicating that negative experiences occurred during conversations between online system users and entities via one or more of the messaging applications 150. Various types of information may indicate that a negative experience occurred during a conversation between an online system user and an entity via a messaging application 150. In some embodiments, this information may include a request from the user to block the entity from communicating with the user via the messaging application 150. For example, an online system user may request that an entity be blocked from sending messages to the user and/or from calling the user via a messaging application 150. Information indicating that a negative experience occurred during a conversation between an online system user and an entity via a messaging application 150 also may include a response to a user survey received from the user, in which the response indicates that a negative experience occurred during the conversation. For example, if a user survey allows an online system user to rate their satisfaction with a conversation with an entity via a messaging application 150, in which a score of one corresponds to a worst possible score and a score of five corresponds to a best possible score, information indicating that a negative experience occurred during the conversation may correspond to a score of two or less. In the above example, the negative experience also may be described by a non-numerical rating (e.g., if the user indicates that they are unlikely or extremely unlikely to contact the entity again). Furthermore, information indicating that a negative experience occurred during a conversation between an online system user and an entity via a messaging application 150 also may include the content of one or more messages communicated between the entity and the user during the conversation, in which the content describes the negative experience (e.g., content that indicates that the user and the entity had an argument, an emoji that indicates a negative emotion of the user, etc.). For example, the content of a message may describe a negative experience occurring during a conversation between an online system user and an entity if the message includes a statement made by the user indicating dissatisfaction of the user (e.g., a statement including words or phrases such as "unfair," "false advertising," etc.).

Content included in a message between an entity and an online system user that indicates that a negative experience occurred during a conversation between the entity and the user via a messaging application 150 may be identified in various ways. In some embodiments, this content may be identified manually (e.g., by an administrator associated with the messaging application 150 or the online system 140). In various embodiments, this content also or alternatively may be identified automatically (e.g., by applying a set of natural language processing techniques to the content, by applying a machine-learning model to the content, etc.) For example, a set of embeddings corresponding to words in a message included in a conversation between an online system user and an entity via a messaging application 150 may be generated using a word embedding algorithm (e.g., Word2Vec) that processes the words in the message and generates embeddings corresponding to the words. In this example, the set of embeddings may then be provided as a set of inputs to a neural network that is trained to predict a likelihood that a negative experience occurred during a conversation based on a set of text data included in the content of the conversation. In the above example, one or more images in a message included in the conversation (e.g., an emoji that indicates anger or other negative emotions) also may be identified using a deep learning model that is trained to predict a likelihood that a negative experience occurred during a conversation based on a set of image data included in the content of the conversation. In the above example, the content of each message associated with at least a threshold predicted likelihood may then be identified.

In some embodiments, information indicating that negative experiences occurred during conversations between online system users and entities via one or more of the messaging applications 150 may be stored in association with various additional types of information. Examples of these additional types of information include information identifying and/or describing a user and/or an entity participating in each conversation, information describing one or more times associated with each conversation, etc. For example, information indicating that a negative experience occurred during a conversation between an online system user and an entity may be stored in association with a username, an email address, or another unique identifier associated with the user and/or the entity. In this example, the information also may be stored in association with one or more timestamps describing when each message included in the conversation was sent or received at a client device 110 associated with the user or the entity. Information indicating that a negative experience occurred during a conversation between an online system user and an entity via a messaging application 150 may be received at the online system 140 from the messaging application 150, the user, and/or the entity (e.g., from a client device 110 associated with the user or the entity).

In some embodiments, the experience store 230 also may store information that indicates that positive and/or neutral experiences occurred during conversations between online system users and entities via one or more of the messaging applications 150. Information indicating that a positive experience occurred during a conversation between an online system user and an entity via a messaging application 150 may include a response to a user survey indicating that a positive experience occurred during the conversation, the content of a message from the user indicating satisfaction of the user with the conversation (e.g., one or more statements made by the user including words or phrases such as "thank you," "wonderful," etc., an emoji that indicates a positive emotion of the user, etc.). Information indicating that a neutral experience occurred during a conversation between an online system user and an entity via a messaging application 150 may include a response to a user survey received from the user (e.g., a score of three stars out of five stars, a response from the user indicating that they are somewhat likely to contact the entity again, etc.). Information indicating that positive experiences and/or neutral experiences occurred during conversations between online system users and entities via one or more of the messaging applications 150 may be stored in association with various types of information (e.g., information identifying and/or describing each online system user and/or each entity participating in each conversation, information describing one or more times associated with each conversation, etc.). Furthermore, this information may be received at the online system 140 from one or more of the messaging applications 150 and/or one or more online system users or entities participating in the conversations. The experience store 230 is further described below in conjunction with FIGS. 3 and 4A-4C.

The machine-learning module 235 may train (e.g., as shown in step 320 of FIG. 3) a machine-learning model to predict a likelihood of an occurrence of a negative experience during a conversation between an online system user and an entity via a messaging application 150. The machine-learning module 235 may train the model based on information indicating that one or more negative experiences previously occurred during one or more conversations between one or more online system users and one or more entities via one or more of the messaging applications 150. As described above, information indicating that a negative experience occurred during a conversation between an online system user and an entity via a messaging application 150 may include a request from the user to block the entity from communicating with the user via the messaging application 150, a response to a user survey received from the user, in which the response indicates that the negative experience occurred during the conversation, and the content of one or more messages between the entity and the user, in which the content describes the negative experience. For example, the machine-learning module 235 may access information stored in the experience store 230 indicating that negative experiences occurred during conversations between online system users and entities via one or more of the messaging applications 150 and train the machine-learning model based on this information.

The machine-learning module 235 also may train the model based on a set of attributes of each entity participating in a conversation during which a negative experience occurred. Examples of attributes of an entity may include user profile information associated with the entity stored in the user profile store 205, information describing actions previously performed by the entity stored in the action log 220, and/or information stored in the edge store 225 describing connections established between the entity and online system users or other entities. In the above example, if one or more of the entities participating in the conversations are business entities, attributes of the entities that may be used to train the model may include an industry associated with each entity, a geographic location associated with each entity (e.g., its headquarters), information describing a duration of each connection established between each entity and an online system user or another entity, etc.

In some embodiments, the machine-learning module 235 also may train the model based on additional types of information. In various embodiments, the machine-learning module 235 also may train the model based on a set of attributes of each online system user participating in a conversation via one or more of the messaging applications 150 during which a negative experience occurred. In such embodiments, attributes of an online system user that may be used to train the model may include user profile information associated with the user stored in the user profile store 205, information describing actions previously performed by the user stored in the action log 220, and/or information stored in the edge store 225 describing connections established between the user and other online system users or entities. In some embodiments, the machine-learning module 235 also may train the model based on information indicating that one or more positive and/or neutral experiences previously occurred during one or more conversations between one or more online system users and one or more entities via one or more of the messaging applications 150. In such embodiments, the machine-learning module 235 also may train the model based on a set of attributes of each entity and/or a set of attributes of each online system user participating in each conversation during which a positive or a neutral experience occurred. In various embodiments, the machine-learning module 235 also may train the model based on information describing one or more times associated with each conversation. For example, when training the model, the machine-learning module 235 may weight different experiences occurring during different conversations differently based on a time at which each conversation occurred, such that negative, positive, and/or neutral experiences that occurred during more recent conversations are assigned a greater weight than negative, positive, and/or neutral experiences that occurred during earlier conversations. The functionality of the machine-learning module 235 is further described below in conjunction with FIG. 3.

The prediction module 240 may access (e.g., as shown in step 330 of FIG. 3) and apply (e.g., as shown in step 335 of FIG. 3) a machine-learning model trained to predict a likelihood of an occurrence of a negative experience by a user of the online system 140 during a potential conversation between the user and an entity via a messaging application 150. The likelihood may be predicted by the trained machine-learning model based on a set of attributes of the entity (e.g., user profile information associated with the entity stored in the user profile store 205, information describing actions previously performed by the entity stored in the action log 220, and/or information stored in the edge store 225 describing connections established between the entity and online system users or other entities). For example, the prediction module 240 may provide a set of attributes of an entity as inputs to the trained machine-learning model and receive an output from the model corresponding to a predicted likelihood that a negative experience will occur during a potential conversation between an online system user and the entity via a messaging application 150. In some embodiments, the likelihood also may be predicted by the trained machine-learning model based on a set of attributes of the user (e.g., user profile information associated with the user stored in the user profile store 205, information describing actions previously performed by the user stored in the action log 220, and/or information stored in the edge store 225 describing connections established between the user and other online system users or entities). In the above example, the prediction module 240 also may provide a set of attributes of the user as inputs to the trained machine-learning model and receive an output from the model corresponding to the predicted likelihood that the negative experience will occur during the potential conversation between the user and the entity via the messaging application 150. The functionality of the prediction module 240 is further described below in conjunction with FIG. 3.

The value adjustment module 245 adjusts (e.g., as shown in step 340 of FIG. 3) a value associated with presenting a link that launches a messaging application 150 and initiates a potential conversation with an entity via the messaging application 150. The value associated with presenting the link may be based on a bid amount associated with a content item that includes the link, a cost for a given number of impressions of the content item (e.g., cost per thousand impressions), or any other suitable value. The adjustment module 245 may adjust the value based on a predicted likelihood of an occurrence of a negative experience by a user of the online system 140 during the potential conversation between the user and the entity via the messaging application 150. In some embodiments, the value associated with presenting the link is adjusted to a lower value by an amount that is proportional to the predicted likelihood. For example, suppose that a value associated with presenting a link that initiates a potential conversation with an entity via a messaging application 150 corresponds to a bid amount associated with a content item that includes the link. In this example, the value adjustment module 245 may adjust the bid amount associated with the content item to a lower value if a predicted likelihood of a negative experience occurring during the potential conversation between an online system user and the entity is high. Alternatively, in the above example, the value adjustment module 245 may adjust the bid amount associated with the content item that includes the link to a higher value if the predicted likelihood of the negative experience occurring during the potential conversation between the online system user and the entity is low.

Once the value adjustment module 245 has adjusted a value associated with presenting a link that launches a messaging application 150 and initiates a potential conversation with an entity via the messaging application 150, the value adjustment module 245 passes (e.g., as shown in step 345 of FIG. 3) the adjusted value to a content selection process that selects content for presentation to a user of the online system 140. The content selection process may then be performed by the content selection module 250, described below. The functionality of the value adjustment module 245 is further described below in conjunction with FIG. 3.

The content selection module 250 selects (e.g., as shown in step 350 of FIG. 3) one or more content items for communication to a client device 110 to be presented to a viewing user of the online system 140. Content items eligible for presentation to the viewing user are retrieved from the content store 210 or from another source by the content selection module 250, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 250 includes content items eligible for presentation to the viewing user in one or more content selection processes, which identify a set of content items for presentation to the viewing user. For example, the content selection module 250 determines measures of relevance of various content items to the viewing user based on characteristics associated with the viewing user by the online system 140 and based on the viewing user's affinity for different content items. Based on the measures of relevance, the content selection module 250 selects content items for presentation to the viewing user. As an additional example, the content selection module 250 selects content items having the highest measures of relevance or having at least a threshold measure of relevance for presentation to the viewing user. Alternatively, the content selection module 250 ranks content items based on their associated measures of relevance and selects content items having the highest positions in the ranking or having at least a threshold position in the ranking for presentation to the viewing user.

Content items selected for presentation to a viewing user may be associated with bid amounts. The content selection module 250 may use the bid amounts associated with content items when selecting content for presentation to a viewing user. In various embodiments, the content selection module 250 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of a viewing user presented with the content from the content item interacting with the content. The content selection module 250 may rank content items based on their associated bid amounts and select content items having at least a threshold position in the ranking for presentation to a viewing user. In some embodiments, the content selection module 250 ranks both content items not associated with bid amounts and content items associated with bid amounts in a unified ranking based on bid amounts and measures of relevance associated with content items. Based on the unified ranking, the content selection module 250 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 250 receives a request to present a feed of content to a viewing user of the online system 140. The feed may include one or more advertisements as well as other content items, such as stories describing actions associated with other online system users connected to the viewing user. The content selection module 250 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 250 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 250 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the online system 140 presents content to a viewing user through a newsfeed including a plurality of content items selected for presentation to the viewing user. One or more advertisements also may be included in the feed. The content selection module 250 may determine the order in which selected content items are presented via the feed. For example, the content selection module 250 orders advertisements or other content items in the feed based on likelihoods of the viewing user interacting with various content items. The functionality of the content selection module 250 is further described below in conjunction with FIG. 3.

The web server 255 links the online system 140 via the network 120 to the one or more client devices 110, as well as to the one or more third-party systems 130 and to the one or more messaging applications 150. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
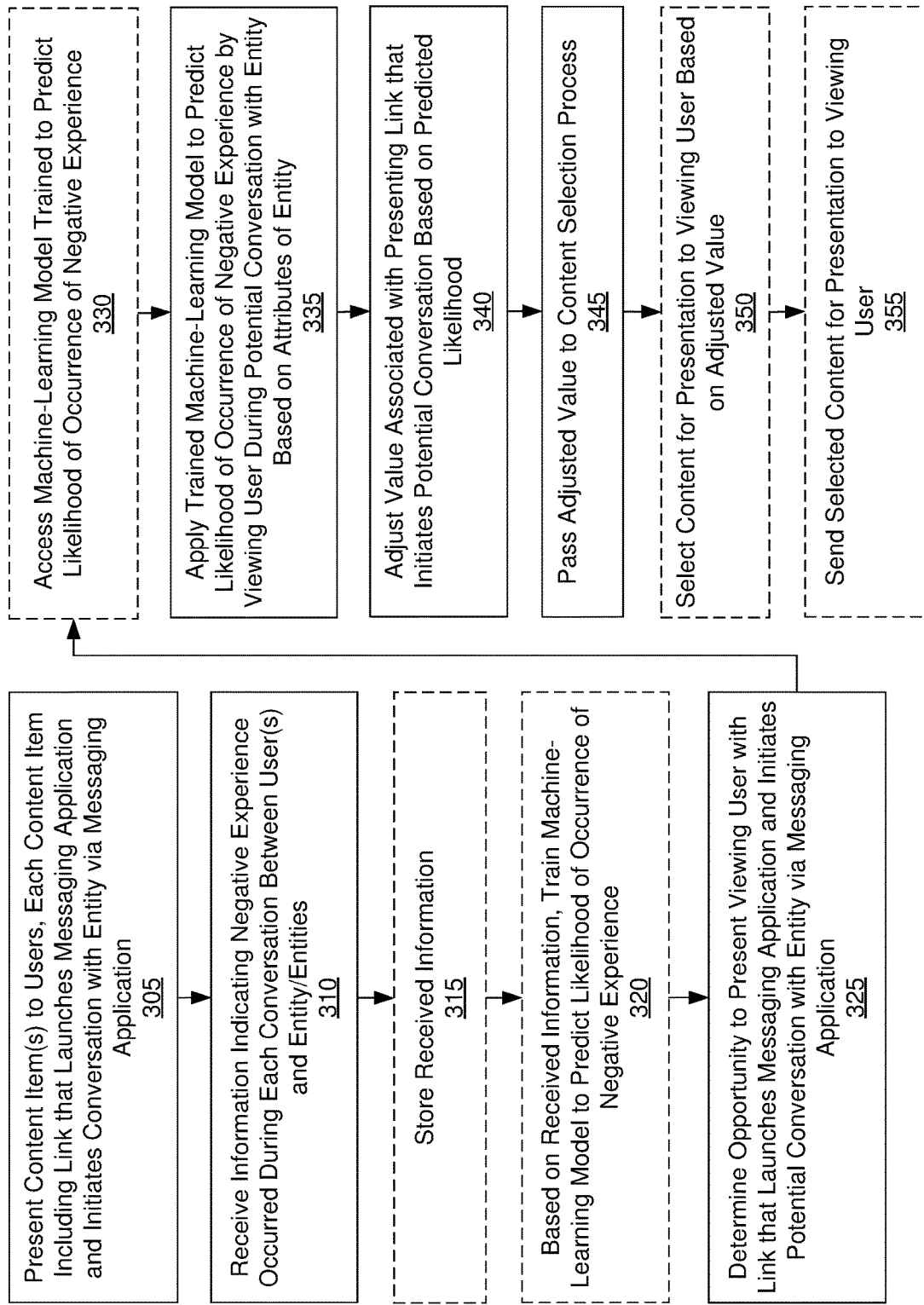
FIG. 3 is a flow chart of a method for adjusting a value associated with presenting an online system user with a link that initiates a conversation with an entity via a messaging application, in accordance with an embodiment.

Adjusting a Value Associated with Presenting an Online System User with a Link that Initiates a Conversation with an Entity Via a Messaging Application FIG. 3 is a flow chart of a method for adjusting a value associated with presenting an online system user with a link that initiates a conversation with an entity via a messaging application. In other embodiments, the method may include different and/or additional steps than those shown in FIG. 3. Additionally, steps of the method may be performed in a different order than the order described in conjunction with FIG. 3.

The online system 140 presents 305 one or more content items to one or more users of the online system 140, in which each content item includes a link that launches a messaging application 150 and initiates a conversation with an entity via the messaging application 150. A messaging application 150 allows an online system user and an entity to participate in a conversation by using client devices 110 associated with the user and the entity to send and receive messages via the messaging application 150. For example, suppose that the online system 140 presents 305 one or more users of the online system 140 with one or more content items, in which each content item is presented 305 to a user in a newsfeed associated with a user profile of the user. In this example, one or more of the content items presented 305 to the users may be associated with one or more entities (e.g., businesses or organizations). Furthermore, in the above example, each content item may include a link that launches a messaging application 150 and initiates a conversation with an associated entity upon receiving an interaction with the link by a user to whom the content item is presented 305.

The online system 140 then receives 310 information indicating that a negative experience occurred during each of a set of conversations between the online system user(s) and the entity/entities via a messaging application 150. This information may be received 310 from the messaging application 150 and/or an online system user or an entity participating in each conversation (e.g., from a client device 110 associated with the user or the entity). Furthermore, this information may be received 310 in association with various types of information (e.g., information identifying and/or describing the user and/or the entity participating in each conversation, information describing one or more times associated with each conversation, etc. Additionally, this information may be identified by the messaging application 150 and/or by the online system 140 manually or automatically (e.g., using a machine-learning model, using a set of natural language processing techniques, etc.).

Figure 4A:
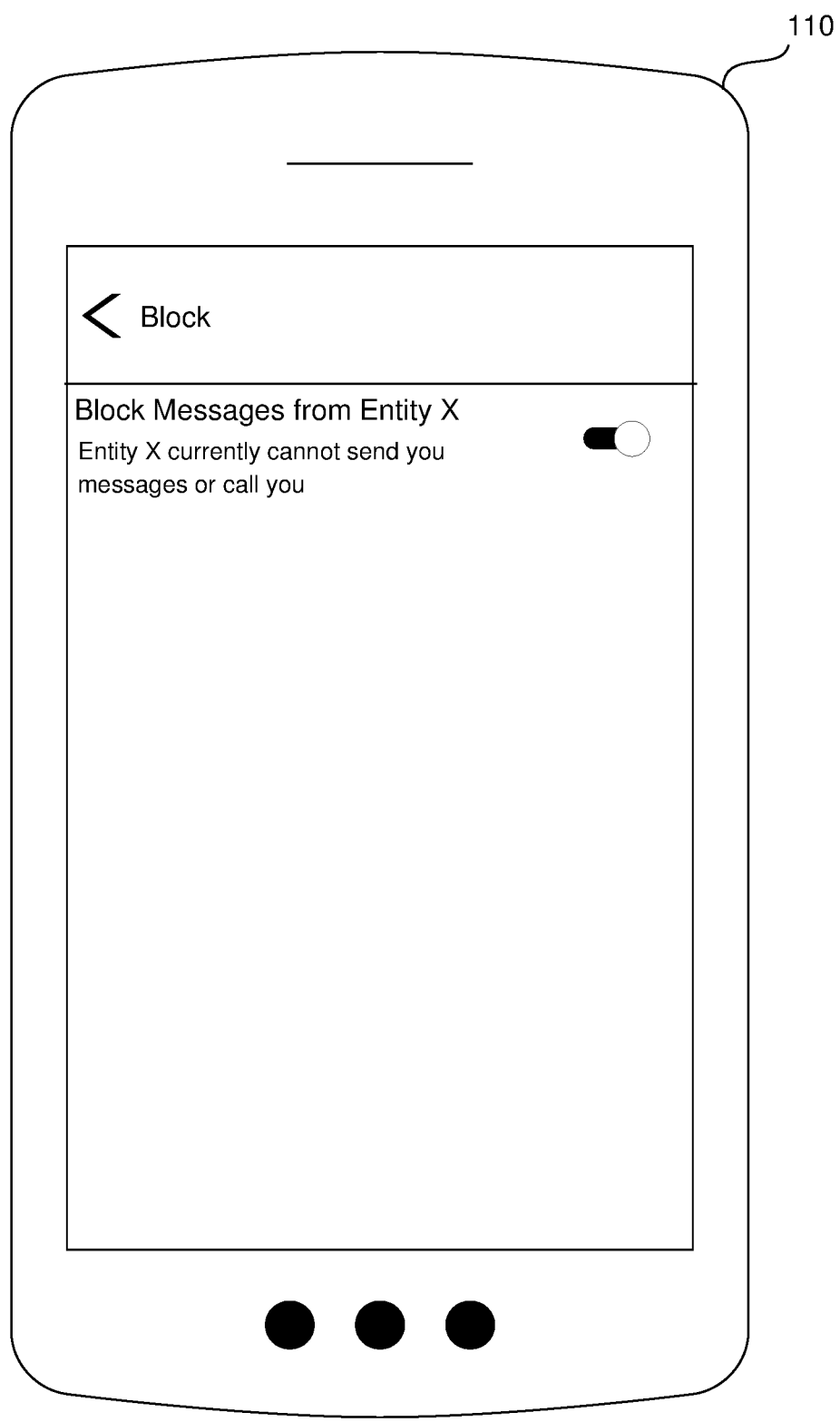
FIGS. 4A-4C are examples of information indicating that a negative experience occurred during a conversation between a user of an online system and an entity via a messaging application, in accordance with an embodiment.
Figure 4B:
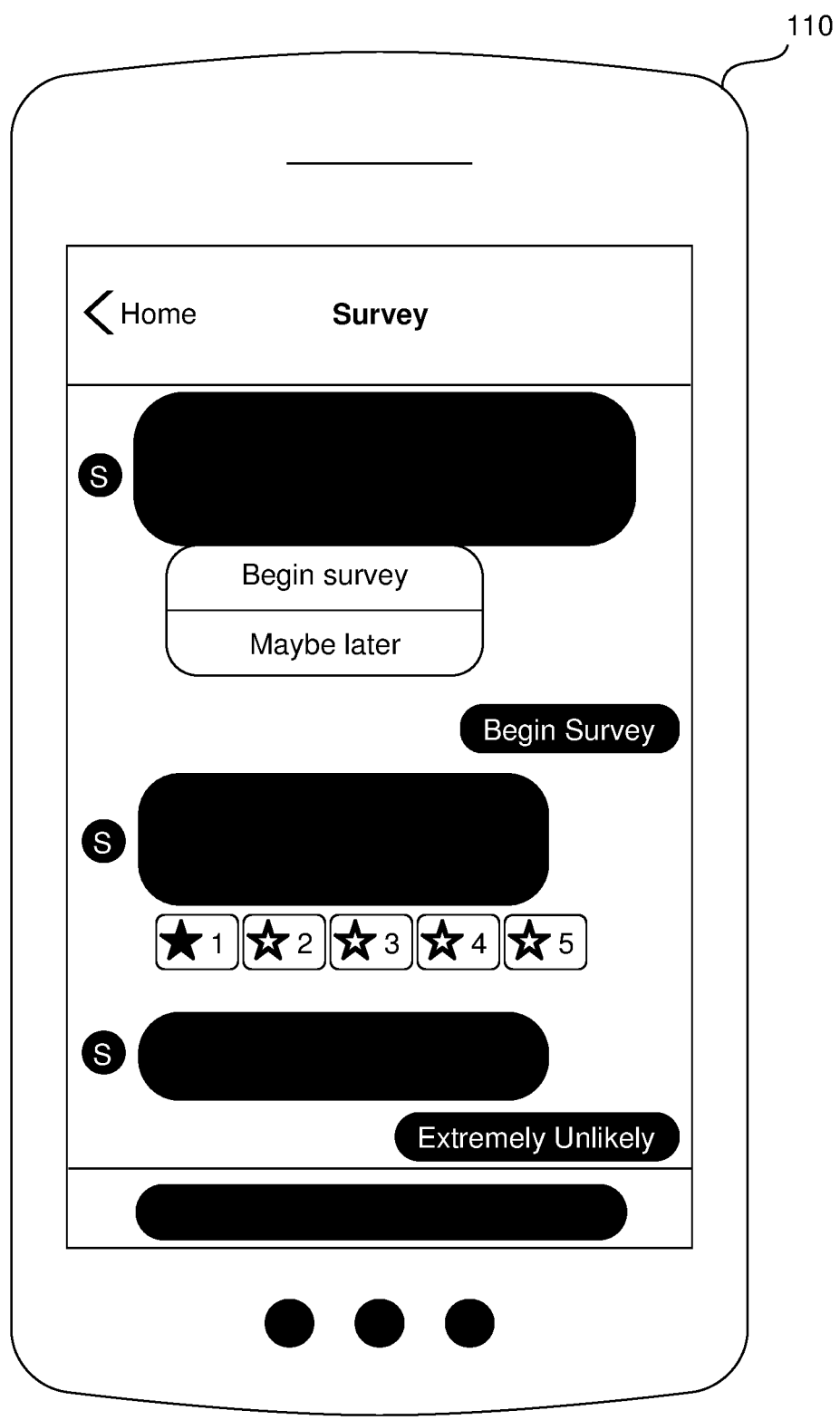
Figure 4C:

Various types of Information may indicate that a negative experience occurred during a conversation between an online system user and an entity via a messaging application 150. As described above, this information may include a request from the user to block the entity from communicating with the user via the messaging application 150, a response to a user survey received 310 from the user indicating that the negative experience occurred, and/or the content of one or more messages communicated between the entity and the user during the conversation that describes the negative experience. For example, as shown in FIG. 4A, the online system 140 may receive 310 information from a client device 110 associated with an online system user indicating that the user requested that an entity be blocked from sending messages to the user and/or from calling the user via a messaging application 150. As an additional example, as shown in FIG. 4B, suppose that a user survey presented to an online system user within a messaging application 150 via a client device 110 associated with the user allows the user to rate their satisfaction with a conversation with an entity via the messaging application 150. In this example, if a rating of one star corresponds to a worst possible rating and a rating of five stars corresponds to a best possible rating and a rating of one star is received 310 from the user, the user's response indicates that a negative experience occurred during the conversation. As also shown in FIG. 4B, if the survey allows the user to indicate whether they are likely to contact the entity again and a response is received 310 from the user indicating that they are extremely unlikely to do so, the user's response also indicates that a negative experience occurred during the conversation. As yet another example, FIG. 4C illustrates a chat user interface presented in a display area of a client device 110 associated with an online system user. In this example, the content of a message between an entity and the user describes a negative experience occurring during a conversation between the entity and the user via a messaging application 150 since a statement made by the user (i.e., "That's false advertising!") indicates dissatisfaction of the user.

In some embodiments, the online system 140 also may receive information indicating that a positive and/or a neutral experience occurred during each of a set of conversations between the online system user(s) and the entity/entities via a messaging application 150. As described above, information indicating that a positive experience occurred during a conversation between an online system user and an entity via a messaging application 150 may include a response to a user survey received from the user indicating that the positive experience occurred and the content of one or more messages between the user and the entity (e.g., a statement made by the user indicating satisfaction of the user with the conversation, an emoji that indicates a positive emotion of the user, etc.). As also described above, information indicating that a neutral experience occurred during a conversation between an online system user and an entity via a messaging application 150 may include a response to a user survey received from the user (e.g., a score of three stars out of five stars, a response from the user indicating that they are somewhat likely to contact the entity again, etc.).

Referring back to FIG. 3, in some embodiments, the online system 140 may store 315 the information indicating that a negative experience occurred during each of the set of conversations (e.g., in the experience store 230). In embodiments in which the online system 140 also receives information indicating that a positive and/or a neutral experience occurred, information describing each of these experiences also may be stored by the online system 140 (e.g., in the experience store 230). Furthermore, in some embodiments, this information may be stored 315 in association with various additional types of information (e.g., information identifying and/or describing each online system user and/or each entity participating in each conversation, information describing one or more times associated with each conversation, etc.).

In some embodiments, the online system 140 may train 320 (e.g., using the machine-learning module 235) a machine-learning model to predict a likelihood of an occurrence of a negative experience during a conversation between an online system user and an entity via a messaging application 150. The online system 140 may train 320 the model based on information indicating that one or more negative experiences previously occurred during one or more conversations between one or more online system users and one or more entities via one or more of the messaging applications 150. For example, to train 320 the machine-learning model to predict a likelihood of an occurrence of a negative experience during a conversation between an online system user and an entity via a messaging application 150, the online system 140 may access information stored 315 in the online system 140 (e.g., in the experience store 230) describing negative experiences occurring during conversations between online system users and entities via the messaging application 150 and train 320 the model using this information. The online system 140 also may train 320 the model based on a set of attributes of each entity participating in each conversation during which a negative experience occurred (e.g., user profile information associated with the entity stored in the user profile store 205, information describing actions previously performed by the entity stored in the action log 220, and/or information stored in the edge store 225 describing connections established between the entity and online system users or other entities).

The online system 140 also may train 320 the model based on additional types of information. In various embodiments, the online system 140 also may train 320 the model based on a set of attributes of each online system user participating in each conversation during which a negative experience occurred (e.g., user profile information associated with the user stored in the user profile store 205, information describing actions previously performed by the user stored in the action log 220, and/or information stored in the edge store 225 describing connections established between the user and other online system users or entities). In some embodiments, the online system 140 also may train 320 the model based on information indicating that one or more positive and/or neutral experiences previously occurred during one or more conversations between one or more online system users and one or more entities via one or more of the messaging applications 150. In such embodiments, the machine-learning module 235 also may train the model based on a set of attributes of each entity and/or a set of attributes of each online system user participating in each conversation during which a positive or a neutral experience occurred. Furthermore, in various embodiments, the online system 140 also may train 320 the model based on information describing one or more times associated with each conversation, (e.g., such that experiences that occurred during more recent conversations are assigned a greater weight than experiences that occurred during earlier conversations).

The online system 140 then determines 325 an opportunity to present a viewing user of the online system 140 with a link that launches a messaging application 150 and initiates a potential conversation with an entity via the messaging application 150. In some embodiments, the link may be included among content presented to the viewing user. For example, the link may be included in a content item that is presented to the viewing user in a newsfeed associated with a user profile of the viewing user. In this example, the online system 140 may determine 325 an opportunity to present the viewing user with the link upon receiving a request from the viewing user to be presented with the newsfeed.

The online system 140 may access 330 (e.g., using the prediction module 240) the trained machine-learning model and apply 335 (e.g., using the prediction module 240) the model to predict a likelihood of an occurrence of a negative experience of the viewing user during the potential conversation between the viewing user and the entity via the messaging application 150. The likelihood may be predicted by the trained machine-learning model based on a set of attributes of the entity (e.g., user profile information associated with the entity stored in the user profile store 205, information describing actions previously performed by the entity stored in the action log 220, and/or information stored in the edge store 225 describing connections established between the entity and online system users or other entities). For example, the online system 140 may provide a set of attributes of the entity as inputs to the trained machine-learning model and receive an output from the model corresponding to the predicted likelihood that the negative experience will occur during the potential conversation between the viewing user and the entity via the messaging application 150. In some embodiments, the likelihood also may be predicted by the trained machine-learning model based on a set of attributes of the viewing user (e.g., user profile information associated with the viewing user stored in the user profile store 205, information describing actions previously performed by the viewing user stored in the action log 220, and/or information stored in the edge store 225 describing connections established between the viewing user and other online system users or entities). In the above example, the online system 140 also may provide a set of attributes of the viewing user as inputs to the trained machine-learning model and receive an output from the model corresponding to the predicted likelihood that the negative experience will occur during the potential conversation between the viewing user and the entity via the messaging application 150.

Based on the predicted likelihood of the occurrence of the negative experience by the viewing user during the potential conversation, the online system 140 then adjusts 340 (e.g., using the value adjustment module 245) a value associated with presenting the link that launches the messaging application 150 and initiates the potential conversation with the entity via the messaging application 150. The value associated with presenting the link may be based on a bid amount associated with a content item that includes the link, a cost for a given number of impressions of the content item (e.g., cost per thousand impressions), or any other suitable value. The value associated with presenting the link may be adjusted 340 to a lower value by an amount that is proportional to the predicted likelihood. For example, if the value associated with presenting the link that initiates the potential conversation with the entity via the messaging application 150 corresponds to a bid amount associated with a content item that includes the link, the bid amount may be adjusted 340 to a lower value if the predicted likelihood is high.

Alternatively, in the above example, the bid amount associated with the content item that includes the link may be adjusted 340 to a higher value if the predicted likelihood is low.

Once the online system 140 has adjusted 340 the value associated with presenting the link that launches the messaging application 150 and initiates the potential conversation with the entity via the messaging application 150, the online system 140 passes 345 (e.g., using the value adjustment module 245) the adjusted value to a content selection process, which may be performed to select 350 (e.g., using the content selection module 250) content for presentation to the viewing user based on the adjusted value. The selected content subsequently may be sent 355 for presentation to the viewing user. For example, if the link that launches the messaging application 150 and initiates the potential conversation with the entity via the messaging application 150 is included in a content item that may be presented to the viewing user, the online system 140 may select 350 one or more content items for presentation to the viewing user based on the adjusted value and send 355 the selected content item(s) for presentation in a display area of a client device 110 associated with the viewing user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   presenting a set of content items to a set of users of an online system, each of the set of content items comprising a link that launches a messaging application and initiates a conversation via the messaging application;
   receiving information indicating that a negative experience occurred during each of a set of conversations between a subset of the set of users and a set of entities via the messaging application, each of the set of conversations initiated by a link comprising each of a subset of the set of content items;
   training a machine-learning model to predict a likelihood of an occurrence of the negative experience, wherein the machine-learning model is trained based at least in part on the information indicating that the negative experience occurred during each of the set of conversations and a set of attributes of each of the set of entities;
   determining an opportunity to present a viewing user of the online system with a link that launches the messaging application and initiates a potential conversation with an entity via the messaging application;
   applying the trained machine-learning model to predict a likelihood of an occurrence of the negative experience by the viewing user during the potential conversation, the likelihood predicted based at least in part on a set of attributes of the entity;
   adjusting a value associated with presenting the link that initiates the potential conversation based at least in part on the predicted likelihood; and
   passing the adjusted value to a content selection process that selects content for presentation to the viewing user.

2. The method of claim 1, wherein the value associated with presenting the link that initiates the potential conversation is adjusted to a lower value by an amount that is proportional to the predicted likelihood.

3. The method of claim 1, wherein the information indicating that the negative experience occurred during each of the set of conversations comprises one or more of: a request from a user of the online system to block an entity from communicating with the user, a content of one or more messages between an entity and a user of the online system, wherein the content describes the negative experience, and a response to a user survey received from a user of the online system, wherein the response indicates that the negative experience occurred.

4. The method of claim 3, wherein text data comprising the content of the one or more messages between the entity and the user of the online system are detected using one or more natural language processing techniques.

5. The method of claim 3, wherein image data comprising the content of the one or more messages between the entity and the user of the online system are detected using a deep learning model.

6. The method of claim 1, wherein training the machine-learning model is further based at least in part on a set of attributes of each of the set of users.

7. The method of claim 6, wherein the predicted likelihood of the occurrence of the negative experience by the viewing user during the potential conversation is further based at least in part on a set of attributes of the viewing user.

8. The method of claim 1, further comprising:
storing the information indicating that the negative experience occurred during each of the set of conversations and the set of attributes of each of the set of entities;
using the content selection process to select one or more content items for presentation to the viewing user; and
sending the selected one or more content items for presentation to the viewing user.

9. The method of claim 1, wherein the content selection process ranks a set of content items eligible for presentation to the viewing user based at least in part on the adjusted value, one or more of the set of content items comprising the link that initiates the potential conversation.

10. The method of claim 1, wherein the value associated with presenting the link that initiates the potential conversation is based at least in part on one or more of: a bid amount associated with a content item comprising the link that initiates the potential conversation and a cost for a given number of impressions of the content item.

11. A computer program product comprising a non-transitory computer readable storage medium having instructions encoded thereon that, when executed by a processor, cause the processor to:
present a set of content items to a set of users of an online system, each of the set of content items comprising a link that launches a messaging application and initiates a conversation via the messaging application;
receive information indicating that a negative experience occurred during each of a set of conversations between a subset of the set of users and a set of entities via the messaging application, each of the set of conversations initiated by a link comprising each of a subset of the set of content items;
determine an opportunity to present a viewing user of the online system with a link that launches the messaging application and initiates a potential conversation with an entity via the messaging application;
access a trained machine-learning model that predicts a likelihood of an occurrence of the negative experience, wherein the machine-learning model is trained based at least in part on the information indicating that the negative experience occurred during each of the set of conversations and a set of attributes of each of the set of entities;
apply the trained machine-learning model to predict a likelihood of an occurrence of the negative experience by the viewing user during the potential conversation, the likelihood predicted based at least in part on a set of attributes of the entity;
adjust a value associated with presenting the link that initiates the potential conversation based at least in part on the predicted likelihood; and
pass the adjusted value to a content selection process that selects content for presentation to the viewing user.

12. The computer program product of claim 11, wherein the value associated with presenting the link that initiates the potential conversation is adjusted to a lower value by an amount that is proportional to the predicted likelihood.

13. The computer program product of claim 11, wherein the information indicating that the negative experience occurred during each of the set of conversations comprises one or more of: a request from a user of the online system to block an entity from communicating with the user, a content of one or more messages between an entity and a user of the online system, wherein the content describes the negative experience, and a response to a user survey received from a user of the online system, wherein the response indicates that the negative experience occurred.

14. The computer program product of claim 13, wherein text data comprising the content of the one or more messages between the entity and the user of the online system are detected using one or more natural language processing techniques.

15. The computer program product of claim 13, wherein image data comprising the content of the one or more messages between the entity and the user of the online system are detected using a deep learning model.

16. The computer program product of claim 11, wherein train the machine-learning model is further based at least in part on a set of attributes of each of the set of users.

17. The computer program product of claim 16, wherein the predicted likelihood of the occurrence of the negative experience by the viewing user during the potential conversation is further based at least in part on a set of attributes of the viewing user.

18. The computer program product of claim 11, wherein the computer-readable storage medium further has instructions encoded thereon that, when executed by the processor, cause the processor to:
store the information indicating that the negative experience occurred during each of the set of conversations and the set of attributes of each of the set of entities;
use the content selection process to select one or more content items for presentation to the viewing user; and
send the selected one or more content items for presentation to the viewing user.

19. The computer program product of claim 11, wherein the content selection process ranks a set of content items eligible for presentation to the viewing user based at least in part on the adjusted value, one or more of the set of content items comprising the link that initiates the potential conversation.

20. The computer program product of claim 11, wherein the value associated with presenting the link that initiates the potential conversation is based at least in part on one or more of: a bid amount associated with a content item comprising the link that initiates the potential conversation and a cost for a given number of impressions of the content item.

* * * * *